United States Patent [19]
Fortune et al.

[11] Patent Number: 4,765,229
[45] Date of Patent: Aug. 23, 1988

[54] PORTABLE VACUUM PUMP FOR DESOLDERING PURPOSES

[76] Inventors: William S. Fortune, 29866 Cuthbert St., Malibu, Calif. 90265; Robert E. Dallons, 6625 Tamarind St., Agoura, Calif. 91301

[21] Appl. No.: 627,067

[22] Filed: Jul. 2, 1984

[51] Int. Cl.$^4$ ............................................ F01B 29/00
[52] U.S. Cl. .................................. 92/128; 92/130 C; 92/133; 173/121; 228/20
[58] Field of Search ...................... 92/128, 130 C, 133; 228/20; 173/116, 121

[56] References Cited

U.S. PATENT DOCUMENTS 3,263,889  8/1966  Fortune .................................. 228/20
3,818,539  6/1974  Fortune .................................. 228/20

FOREIGN PATENT DOCUMENTS 2907421  8/1980  Fed. Rep. of Germany .

Primary Examiner—Abraham Hershkovitz
Attorney, Agent, or Firm—Daniel T. Anderson

[57] ABSTRACT

A portable vacuum pump for desoldering applications has a hollow cylindrical barrel forming a vacuum cylinder containing a plunger. The pump has a trigger housing containing a single compression spring. The spring is mounted outside the barrel. No separate return spring is required to hold the trigger in the latched position. The single trigger keeps the spring end out of the barrel and thus out of contact with the soldering debris. This allows more space for the plunger, producing a longer stroke and a higher vacuum.

2 Claims, 6 Drawing Sheets

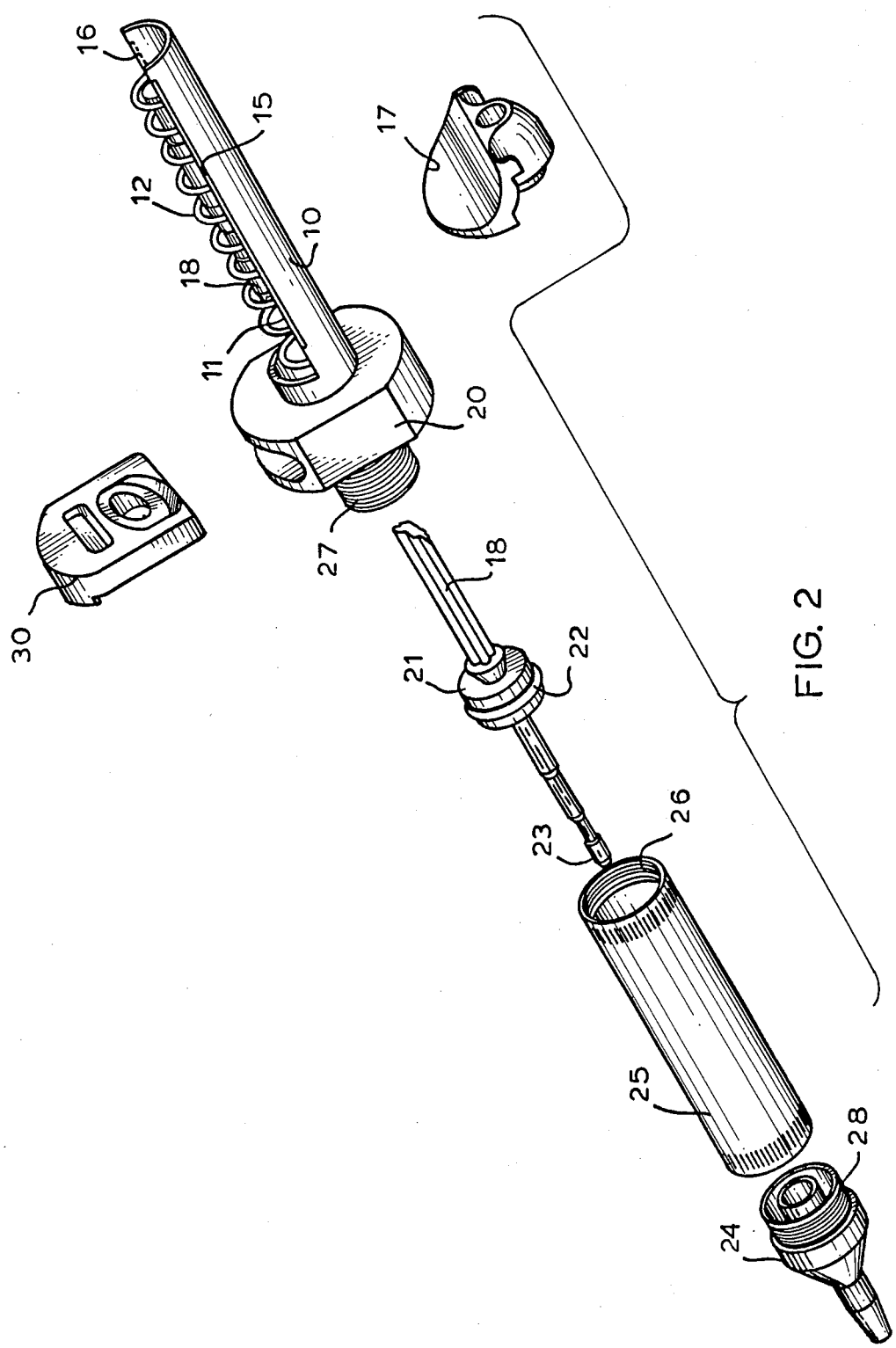

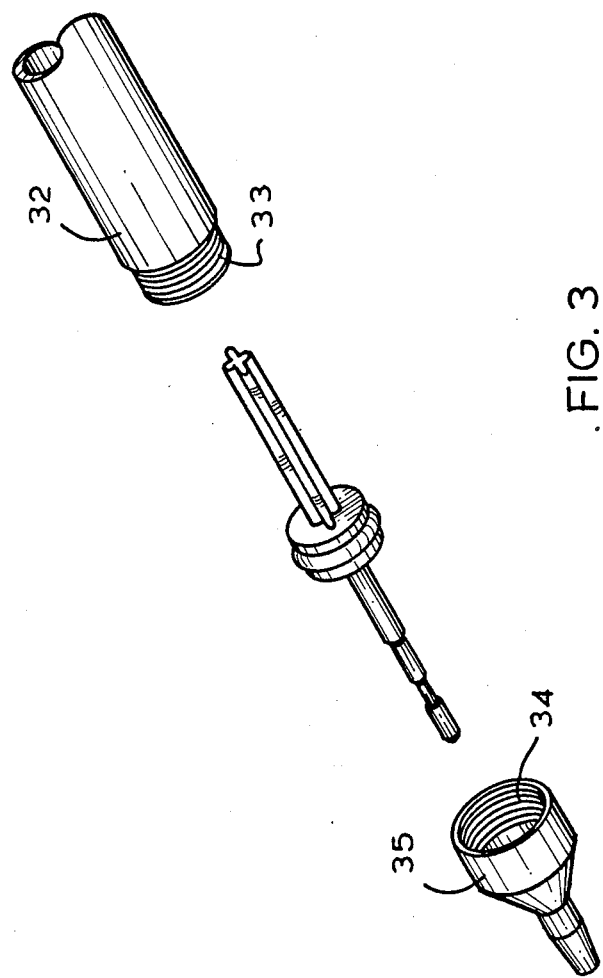

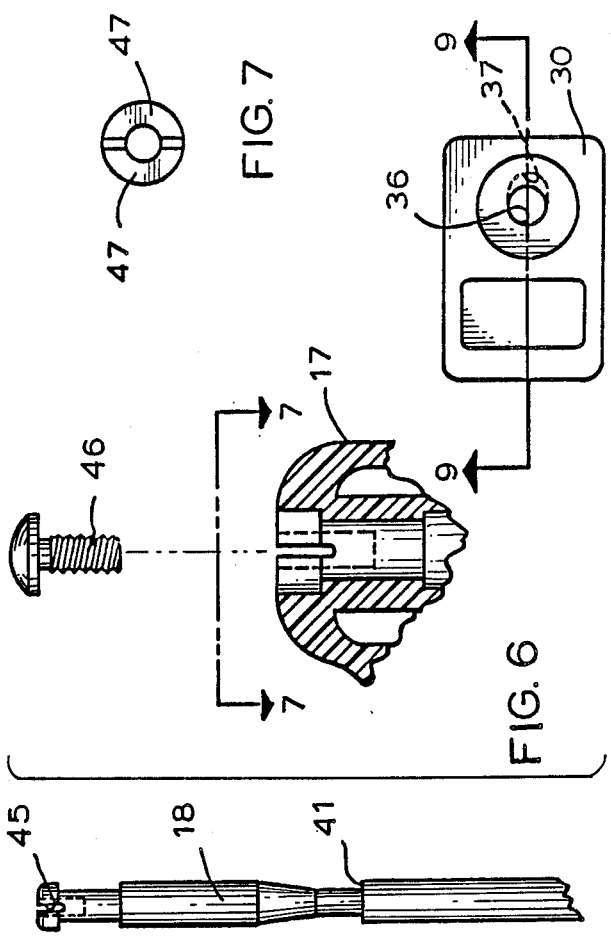
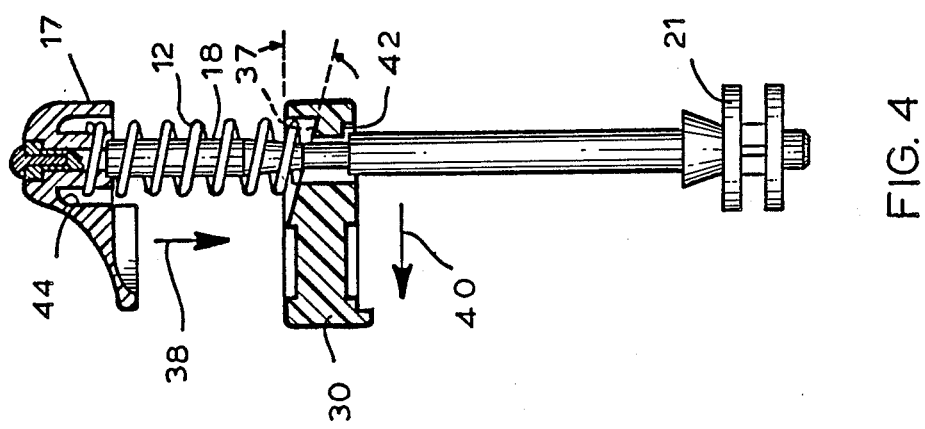

PORTABLE VACUUM PUMP FOR DESOLDERING PURPOSES

BACKGROUND OF THE INVENTION

This invention relates generally to portable vacuum pumps and particularly to those suitable for desoldering purposes.

The present application may be considered to be a substantial improvement over a prior application to the present inventors, which has been entitled, "Hand or Air Pressure Operated Desoldering Instrument." The prior application was filed on Jan. 25, 1982, under Ser. No. 342,320.

The present invention is characterized by some substantial advantages and simplifications with respect to the prior application, above referred to. For example, it requires only a single spring rather than having a second spring for the trigger. It may also be noted that the entire instrument is substantially symmetrically arranged with respect to a central axis.

SUMMARY OF THE INVENTION

In accordance with the present invention, there is provided a portable vacuum pump for desoldering purposes. It comprises a spring guide within which extends longitudinally a single spring. The spring guide is open along its entire length and has an outwardly turned portion on opposite edges. A loading knob has inwardly turned edges to ride along the outwardly turned portions of the spring guide. A plunger is disposed within the spring and includes a loading knob secured thereto. A trigger housing has means for passing the plunger therethrough. A barrel has means for screwing it to the trigger housing. The plunger, in turn, has a piston fixed thereto and movable within the barrel, and a tip assembly has means for removably securing it to one end of the barrel.

For a more detailed explanation of the instrument and its operation, reference is made to the following specification.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

BRIEF DESCRIPTION OF THE DRAWINGS

FIG. 2 is an exploded view of the instrument of FIG. 1;

FIG. 3 is a partially exploded view, primarily of the barrel, plunger, and tip assembly, to show a modification thereof;

FIG. 4 is a side elevational view of the plunger, the main spring, the loading knob, the trigger and the rear end of the plunger;

FIG. 5 is a partial view of the plunger of FIG. 4, showing a modification to facilitate securing it to the loading knob;

FIG. 6 is an exploded view of the loading knob with a modification for firmly securing the plunger thereto and including a fastening screw;

FIG. 7 is a top plan view of the loading knob of FIG. 6;

FIG. 8 is a top plan view of the trigger;

FIG. 9 is a side elevational view of the trigger taken on line 9—9 of FIG. 8;

DESCRIPTION OF THE PREFERRED EMBODIMENTS

Figure 1:
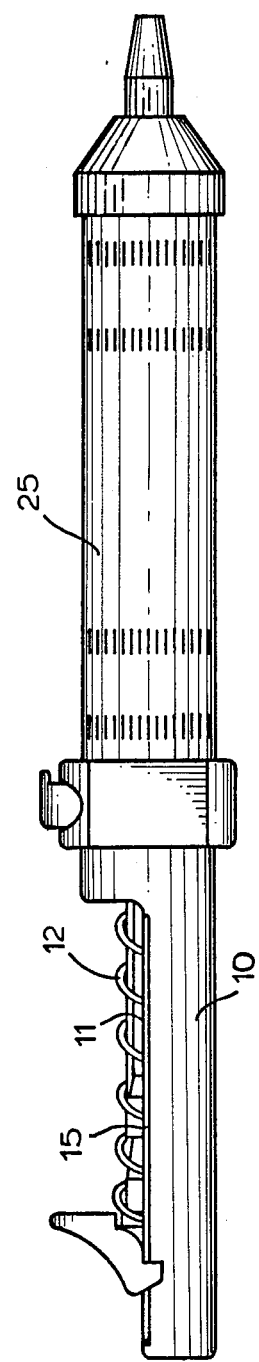
FIG. 1 is a side elevational view of the instrument of the present invention.

Referring now particularly to FIGS. 1 and 2, there is illustrated an instrument in accordance with the present invention, having a trigger housing 10 which is open on one side, as shown at 11, and which houses the one and only compression spring 12 therein. As is clearly shown in FIG. 1, the trigger housing 10 has an outwardly turned portion 15. It will be noted that a corresponding outwardly curved lip 16 is disposed on the opposite side. The loading knob 17 is securely fastened to the plunger shaft 18. The plunger shaft 18 continues beyond the trigger housing 20 and is provided with a plunger or piston 21. The plunger 21 has an internal groove 22 for holding and securing a suitable piston ring such as an O-ring, or the like.

The outer end of the trigger shaft 18 is provided with a portion 23 which is adapted to extend through a tip retainer assembly 24. A barrel 25, which may be made of metal or of plastic, has, in this example, an internal screw thread 26 matching with an external screw thread 27 on the trigger housing 20. The details of the tip assembly 24 will be subsequently explained in connection with FIGS. 12 to 15. The tip assembly 24 is provided with an external thread 28 which mates with a corresponding internal thread of the barrel 25.

The trigger 30 will be more fully explained in connection with FIGS. 4, 8, and 9.

Instead of providing the barrel 25 with internal threads, it is also feasible to provide a barrel 32 with external threads 33 which, in turn, mesh with internal threads 34 of a tip assembly 35. The advantages of this construction, shown in FIG. 3 will be subsequently explained.

Turning now to FIGS. 4, 8, and 9, the detailed construction of the trigger 30 will now be explained. The trigger 30 has a cylindrical opening 36 for the trigger shaft 18 to pass through. However, as will be clearly seen in FIGS. 8 and 9, the trigger 30 is provided with an inclined plane 37, also shown particularly in FIG. 4. Thus, as pressure is exerted on the loading knob 17 and consequently on the spring 12 in the direction of horizontal arrow 38, the trigger 30 has a tendency to move sideways, as shown by the arrow 40. This in turn, means that the shoulder 41 of the trigger shaft 18 will engage the shoulder 42 of the trigger, hence locking the instrument.

Thus, a sideways push on the trigger 30 opposite to the direction of the arrow 40 will disengage the shoulder 41 of the trigger shaft 18 from the shoulder shaft 42 and the spring 12 will move the plunger 21 upwards in the barrel 25, thus creating a vacuum. In this case it should be noted that if the barrel 32 is provided with exterior threads 33, as shown in FIG. 3, the entire interior space of the barrel is unobstructed and the plunger 21 can provide a more complete vacuum.

The stroke of the instrument may readily be adjusted by changing the spring 12 and by making it shorter or longer. The loading knob 17 may be provided with an interior ring-shaped recess 44 to provide more space for the upper windings of the spring 12.

It is generally desirable to secure the plunger 18 securely to the loading knob 17, and this can be accomplished as shown in FIGS. 5 and 6. Here the head of the plunger shaft 18 is split, as shown at 45, and the assembly of the loading knob 17 can be secured by screw 46 to provide a firm but releasable connection. The two positions of the head of the plunger shaft 45 are shown in FIG. 7 at 47.

Figure 10:
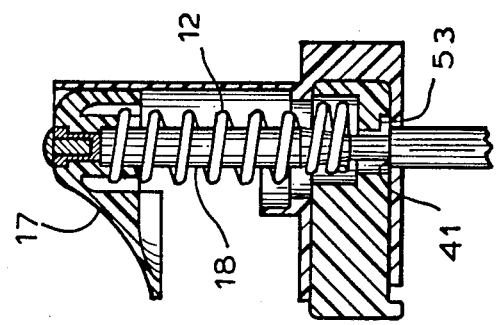
FIG. 10 is a sectional view of the main spring, the loading knob and the trigger, showing a modification thereof.
Figure 11:
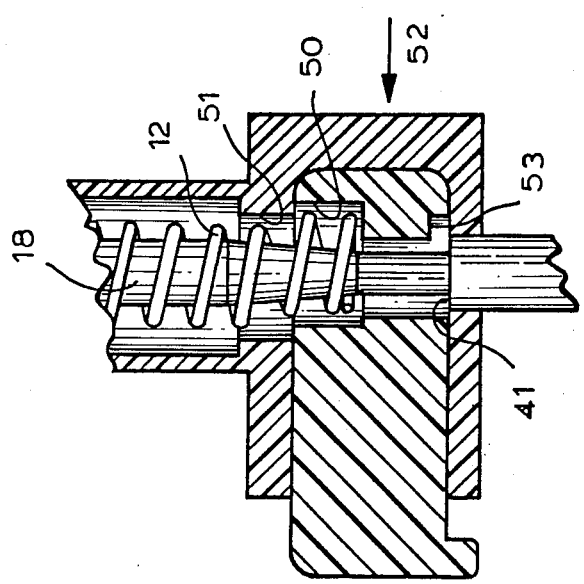
FIG. 11 is an enlarged sectional view of FIG. 10 to illustrate in greater detail the trigger and main spring.
Figure 15:
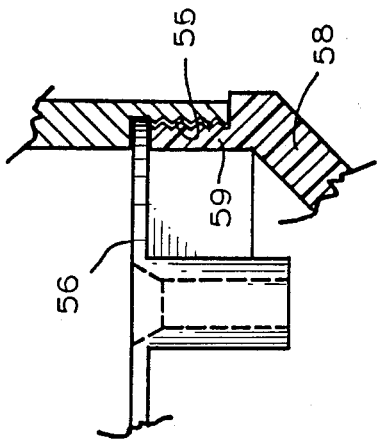
FIG. 15 is an enlarged view of the tip retainer as retained by the internal threads of the barrel and the end cap.

FIGS. 10 and 11, to which reference is now made, show a modification of the trigger arrangement which will move the trigger plate sideways in a different manner. This is accomplished by disposing the outer end of the main spring 12 in a cylindrical space 50 which, however, is eccentrically disposed with respect to cylindrical space 51 directly above. Therefore, when pressure is exerted on the spring 12 by the loading knob 17, the spring has a tendency to move toward the left, in the direction of arrow 52, which in turn will lock the trigger housing, because the shoulder 41 of the plunger 18 will engage shoulder 53 to lock the trigger housing.

It should be noted, however, that the embodiment shown in FIGS. 4 through 9 is preferred.

Referring now to FIGS. 12 through 15, there is illustrated in some detail how the tip assembly may be secured to the barrel 25. The barrel 25 again has an interior thread 55 to which is secured the tip assembly. There is provided a retainer disk 56, the horizontal flat portion of which engages the shoulder at the end of the internal threads 55. The teflon tiplet is shown at 57 and extends through the tip housing 58 having exterior threads 60. The tip housing abuts against the retainer disk 56, while the teflon tiplet extends through the lower opening 61 of the tip assembly. This is clearly shown in FIG. 15 where the retainer disk 56 is disposed within the threads 55. They are backed by a portion 59 of the tip housing 58.

Figure 12:
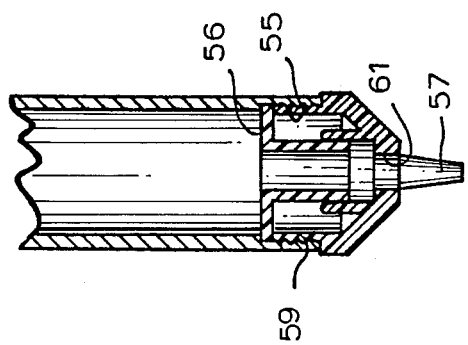
FIG. 12 is a cross-sectional view of the barrel having an internal thread for retaining the tip assembly.
Figure 13:
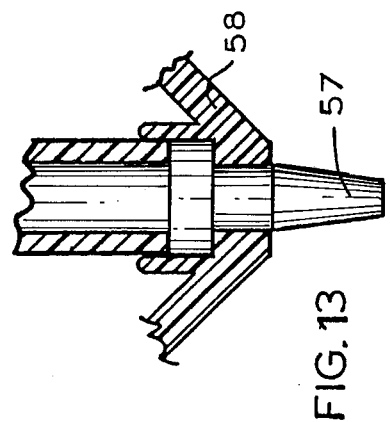
FIG. 13 is an enlarged view of the tip of the tip assembly, with a tiplet.

FIG. 13 shows the tiplet 57 extending through the tip housing 58. The entire assembly is shown in FIG. 12. It will be noted that with the construction shown in FIGS. 12 through 15, the tiplet may readily be exchanged.

Figure 16:
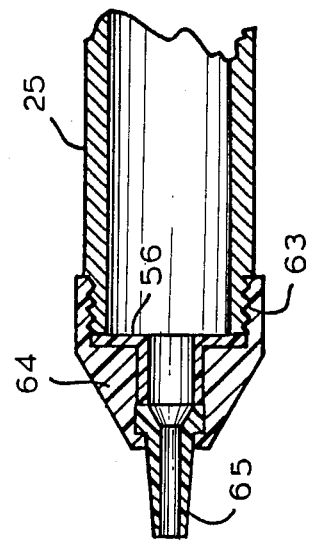
FIG. 16 is a cross-sectional view of the barrel having an external thread for securing thereto the tip assembly.
Figure 14:
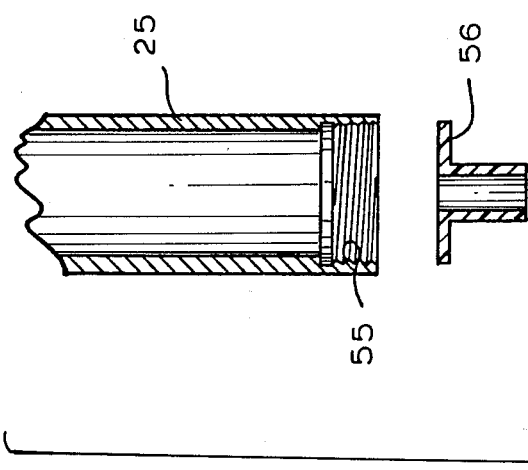
FIG. 14 is an exploded view of the barrel and the tip assembly.

FIG. 16, to which reference is now made, shows a barrel 25 with external threads 63. As a result, the entire tip assembly 64 is held by the threads 63 and, in turn, projects the tiplet 65. As can be clearly seen in FIG. 16, this construction keeps the interior space of the barrel 25 entirely free. The retainer disk 56 provides a support for the tip assembly 64.

A brief summary of the advantages of the present invention over the prior art will now be given. Thus, it will be apparent that no return spring is required to hold the trigger in the latched position. The more tension is applied vertically against the single spring, the more force is applied horizontally to the trigger, to secure a better lock up against the plunger shaft.

Another substantial advantage is the fact that the assembly is exceedingly simple, because all parts can be assembled in a straight line; that is, along a longitudinal axis. This, in turn, means that the instrument may be shipped in disassembled form, thus reducing handling and shipping costs.

Furthermore, the single spring is mounted outside of the barrel instead of within the barrel where it would normally be disposed. The single trigger keeps the spring end out of the barrel, which means that it is not in contact with the soldering debris. This, in turn, allows more space for the plunger and a longer stroke, which results in a higher vacuum.

The loading of the instrument is made much simpler because the loading knob can be pushed, for example, against the edge of a work bench, using one hand. Alternatively, it is feasible to provide a short barrel holder for cocking the instrument. This is particularly advantageous for repeated operations.

Furthermore, the instrument requires a minimum of parts, including a floating plunger shaft which may be extra long but which does not impact any solid stop, or the like, during its operation. Due to the method of guiding the loading knob, the plunger shaft cannot be accidentally bent.

The spring may be safely secured to the loading knob to provide for easy assembly and for easy changing.

The loading knob is shaped to seat the edge of the spring guide for loading. It can be readily remounted to change the spring tension.

The shaft and plunger form basically a single piece and require no other assembly than the loading knob. The trigger housing and spring guide is a single piece.

The plunger shaft will float; that is, it can discharge without coming into contact with any possible stop which might cause a kick-back of the instrument.

The spring itself is of a simple design requiring no special hooks. The spring is simply installed between the locking knob and the top of the trigger.

What is claimed is:

1. A portable vacuum pump for desoldering purposes comprising:
    a hollow cylindrical barrel forming a vacuum stroke cylinder and having a forward, intake end and a rearward end;
    a plunger guide body removeably carried by said rearward end of said barrel and including
        a forward trigger housing bushing which substantially closes said rearward end, and
        a rearwardly extending sleeve portion disposed axially in alignment with said cylindrical barrel;
    a plunger shaft extending through said bushing into said cylindrical barrel and rearwardly along said sleeve portion of said plunger guide body;
    a loading knob carried by the rear end of said plunger shaft;
    axially sliding, transversely interlocking coupling means disposed intercooperatively on said loading knob and said sleeve portion whereby said loading knob and said plunger shaft have only an axial degree of freedom of motion with respect to said barrel and guide body;
    a piston carried by said shaft near its forward end within said barrel in an axial, air pump stroke relation therewith;

a trigger element plate having a finger engageable portion and a bottom portion disposed oppositely therefrom and having a central opening for the passage therethrough of said shaft,
  said trigger element plate being carried laterally slideable within said trigger housing bushing and retained therein by said shaft with said finger engageable portion extending laterally out of said bushing,
  said trigger element plate having a rearwardly exposed, substantially planar, spring engaging surface which is inclined rearwardly at an angle diverging away from lateral in the direction from said bottom portion to said finger engageable portion of said trigger element plate;
a unitary, single coil vacuum stroke and trigger control spring retained about and coaxially with said shaft axially disposed compressively between said loading knob and said inclined, spring engaging surface of said trigger plate whereby the force of the compressed spring against inclined planar surface biases and displaces said trigger plate laterally in the direction toward its said finger engaging portion; and
trigger latching means disposed intercooperatively on said trigger element plate and said plunger shaft, said latching means being of the character to latch when said vacuum stroke spring is fully compressed by said loading knob and said shaft is displaced fully forward, and to unlatch when said finger engageable portion is pressed to move said trigger element plate laterally inwardly against the lateral component of force exerted by said compressed spring upon said inclined planar surface of said trigger element plate, said trigger latching means comprising a circular retaining shoulder disposed about said shaft near its rearward end, said shoulder being formed by a reduced diameter portion toward said rear end cooperating with a step of increased diameter toward said forward end.

2. A pump as set forth in claim 1 in which said trigger latching means further comprises a cooperating shoulder formed by the intersection of a forwardly exposed surface of said trigger plate and its said central opening.

* * * * *